Nov. 22, 1966   W. R. MITCHELL   3,286,928
HYDRAULIC COMPENSATION OF HIGHWAY STRIPING EQUIPMENT
Filed Nov. 20, 1964   2 Sheets-Sheet 1

INVENTOR
WAYNE R. MITCHELL
BY Karl W. Flocks
ATTORNEY

Nov. 22, 1966   W. R. MITCHELL   3,286,928
HYDRAULIC COMPENSATION OF HIGHWAY STRIPING EQUIPMENT
Filed Nov. 20, 1964   2 Sheets-Sheet 2

INVENTOR

WAYNE R. MITCHELL

BY *Karl W. Flocks*
ATTORNEY

United States Patent Office 3,286,928
Patented Nov. 22, 1966

3,286,928
HYDRAULIC COMPENSATION OF HIGHWAY STRIPING EQUIPMENT
Wayne R. Mitchell, Huntingdon, Pa., assignor to Wald Industries, Inc., Huntingdon, Pa., a corporation of Pennsylvania
Filed Nov. 20, 1964, Ser. No. 412,709
4 Claims. (Cl. 239—150)

The present invention relates to hydraulic compensation for purposes of alignment of equipment used for highway striping and has particular reference to a method of moving the carriage that supports the spray guns or moving the pointer or sight used for guiding the truck carrying the spray equipment.

Through the use of a hydraulically compensated carriage or guide pointer the need for the driver of the truck carrying striping equipment to compensate by his driving on turns or curves in order for the spray to follow a line is eliminated.

The present invention is directed toward an automatic compensating movement of the spray gun carriage or pointer in accordance with the truck steering mechanism making it unnecessary for the driver or other operator to take separate action or exercise judgment to compensate for the turning of the truck in relation to the spray gun mountings.

With the present invention the truck operator has a positive method of guiding the truck and associated striping equipment.

Other objects and advantages of the invention will become apparent upon full consideration of the following detailed description and accompanying drawings in which.

Figure 1:
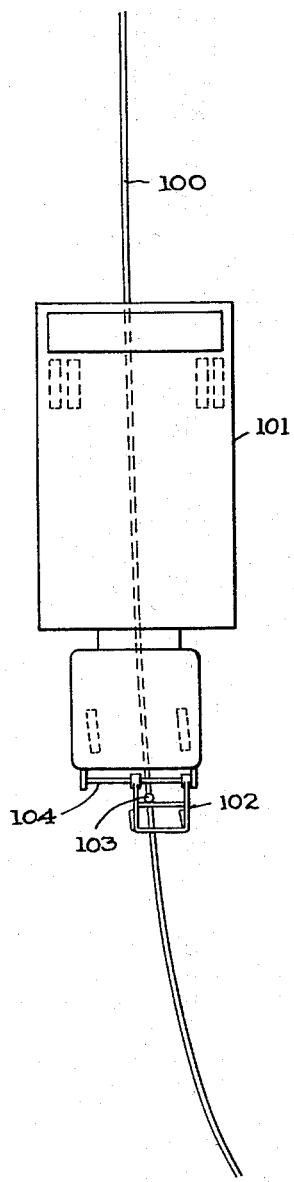
FIGS. 1 and 2 are top views of trucks with gun carriages and pointers following a stripe on a highway.
Figure 2:
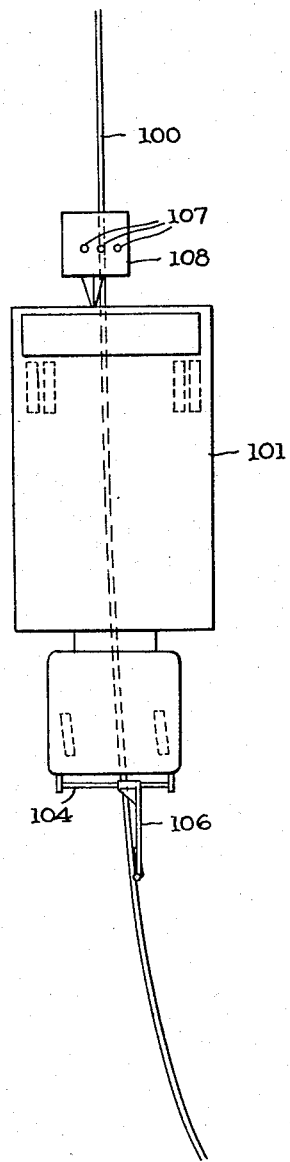

It is necessary for the truck operator who drives a striping machine to follow an old stripe or on new pavement to follow the measured marking indicating where the painted line must go. The turning geometry of a truck is such that the operator must compensate or allow for this geometry when striping curves or turns 100, as illustrated in FIGS. 1 and 2. Any spray guns, pointer or sight mounted in a fixed position on the front of a truck 101 must be moved transversely as well as forward to follow the required path for striping. The common method of moving such apparatus at the present time is by moving the truck out of the path of the turning arc to allow for this geometry. While painting some tight curves the rear wheels of the truck will pass over the painted lines passing through and tracking the wet paint. This makes it impossible to paint a good line under some paving conditions. In addition, this method relies completely on the judgment of the truck driver and requires a practiced and experienced driver to stripe a good line.

Another method already in use to allow for this geometry of turning is to use an independent gun carrier pushed or pulled by the truck and steered by a second operator. This method has the inherent difficulty caused by two operators steering two separate vehicles each of which is influenced by the movements of the other. Any slight variation or miscalculation by either operator will be apparent by wavering in the line.

Regardless of the location of the carriage supporting the spray gun in relation to the truck, it is necessary that there be compensation for the turning of the truck while striping curves. This invention is a means for compensating for this turning geometry of a truck by an automatic compensating movement of the gun carriage or pointer mounted on the truck.

FIG. 1 illustrates a track 101 equipped for painting stripe 100 on the pavement and having a gun carriage 102 carrying spray gun 103 with carriage 102 mounted for reciprocal movement on a transverse bar 104 attached to the front of truck 101. This movement of carriage 102 along transverse bar 104 is used to compensate for the turning geometry of truck 101 when painting stripe 100 while maneuvering a curve or turn.

In a similar manner a pointer 106 is shown in FIG. 2 as mounted on transverse bar 104 attached to the front of truck 101, in place of gun carriage 102. In this case the spray gun or guns 107 are carried on a trailer 108 towed behind truck 101 and the driver of the truck uses pointer 106 as a sight by which to guide truck 101.

The movement of gun carriage 102 or pointer 106 along transverse bar 104 is accomplished automatically by this invention without reliance on the judgment of the truck driver. Thus, the compensation for the turning geometry is accomplished automatically as the truck driver steers truck 101 to follow the marking for a new paint line or the old paint line.

Figure 3:
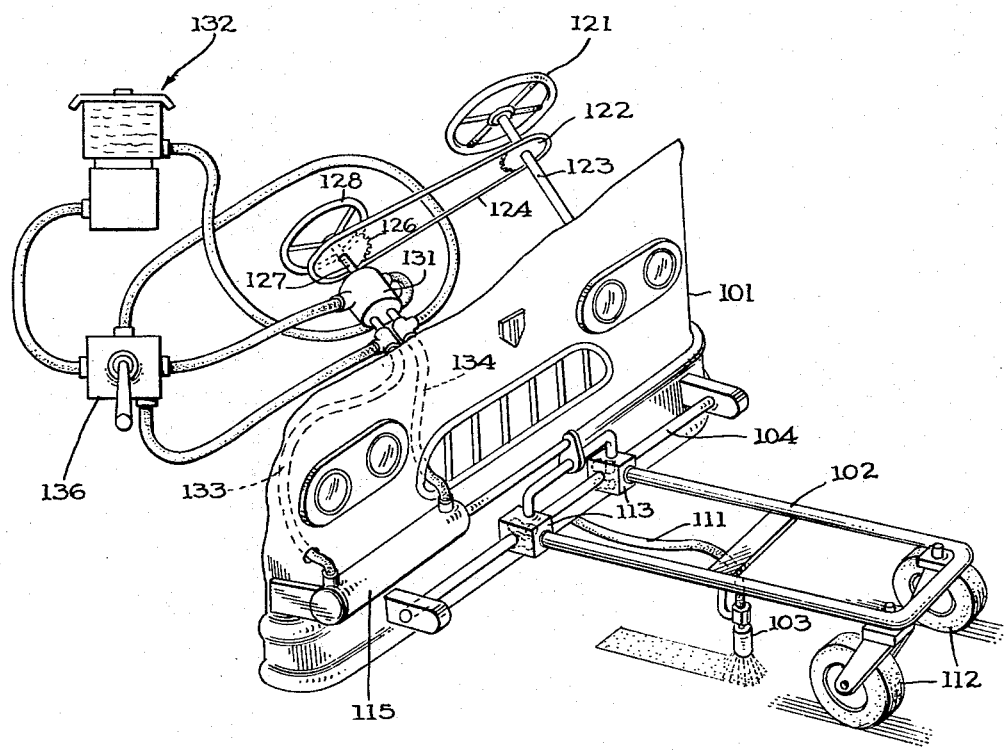
FIG. 3 is a partial perspective and diagrammatic view of a hydraulic system used to position a spray gun carriage.

The mechanism which accomplishes this automatic compensation is shown in FIG. 3 as used in connection with gun carriage 102. In a similar manner pointer 106 could be substituted on the mountings on transverse bar 104.

Gun carriage 102 has a paint spray gun 103 mounted thereon with hose connection 111 from the gun to a paint and compressed air supply carried on truck 101. The forward end of carriage 102 rests on castered wheels 112 which allow transverse movement of carriage 102 along transverse bar 104 on bearing mountings 113. This transverse movement of carriage 102 is caused by the movement of piston rod 114 actuated by transfer of fluid in hydraulic cylinder 115.

The system controlling the operation of the hydraulic cylinder 115 is actuated by the steering wheel of truck 101. As the driver steers the truck 101 by turning truck steering wheel 121, a sprocket 122 mounted on truck steering post 123 turns therewith and moves chain 124 which rotates sprocket 126 mounted on post 127 of auxiliary steering wheel 128 so as to rotate therewith. The rotation of post 127 operates hydraulic steering valve 131 and in combination with hydraulic pump 132 allows metered amounts of hydraulic fluid to flow through hydraulic lines 133 and 134 to opposite ends of hydraulic cylinder 115, thereby repositioning carriage 102 in accordance with the turning of the truck steering wheel 121 by the driver of truck 101. A repositioning valve 136 is also connected into the hydraulic system to bypass hydraulic steering valve 131 in order to move carriage 102 to a center position when starting to stripe a pavement. This type of valving system may be further illustrated by a patent of Lynn L. Charlson, Re. 25,126, entitled Controller for Fluid Pressure Operated Devices.

For the proper operation of this system the diameters of sprockets 122 and 126 must be chosen in a proper ratio to each other. This ratio must be calculated by the movement of carriage 102 which occurs through the action of the whole hydraulic system, but once calculated for the particular hydraulic system components used, and the truck size upon which it is mounted, this ratio should be correct for all striping operations with that truck size and those hydraulic system components to allow automatic compensation for the turning geometry of the truck.

In this system illustrated in FIG. 3, pointer 106 may be substituted for carriage 102 for movement along transverse bar 104. Also, with the use of pointer 106 in the front of truck 101, a spray gun carriage or trailer may be mounted on either side of truck 101 or in the rear as shown in FIG. 2. With the present invention the movement of the pointer may be adjusted through adjustment of sprocket ratio or system components to compensate for the tracking action no matter where the spray gun is located.

It will be obvious to those skilled in the art that various changes may be made without departing from the spirit of the invention and therefore the invention is not limited to what is shown in the drawings and described in the specification but only as indicated in the appended claims.

What is claimed is:
1. Apparatus for striping a pavement comprising
   a truck to carry the striping equipment,
   a transverse bar attached to said truck,
   a paint spraying means movably attached to said transverse bar for reciprocal movement along said bar within the limits of extensions of longitudinal lines defining the width of said truck,
   a hydraulic cylinder attached to said truck and having a piston rod attached to said support means for the movement of said support means along said bar,
   a steering wheel assembly mounted in said truck for guiding of said truck,
   and a hydraulic valve operatively attached to said steering wheel assembly for rotation therewith in a predetermined ratio between said hydraulic valve and said steering wheel assembly,
   said hydraulic valve hydraulically connected to said hydraulic cylinder so as to control the movement of said piston rod.
2. Apparatus for striping a pavement comprising
   a truck to carry the striping equipment,
   a bar attached to the front of said truck transverse to the length of said truck,
   a carriage having one end mounted for movement along said bar,
   castered wheels mounted to support the opposite end of said carriage,
   paint spraying means positioned to strip the pavement mounted on said carriage and to move within the limits of extensions of longitudinal lines defining the width of said truck,
   a steering wheel assembly mounted in said truck for guiding of said truck,
   a sprocket mounted on said steering wheel assembly for rotation therewith,
   chain means connecting with said sprocket,
   a second sprocket connecting with said chain means,
   a hydraulic control system including
      a hydraulic valve connected to said second sprocket for operation in conjunction with the rotation of said second sprocket,
      a hydraulic pump, a second valve, and a hydraulic cylinder hydraulically connected to said hydraulic valve,
      said second valve hydraulically connected in said hydraulic control system as a bypass of said hydraulic valve,
      said hydraulic cylinder having a piston rod attached to said carriage and having the movement of said piston rod controlled by said hydraulic valve.
3. Apparatus for striping a pavement comprising
   a truck to carry the striping equipment,
   a paint spraying means movably attached to said truck for reicprocal movement in relation to said truck within the limits of extensions of longitudinal lines defining the width of said truck,
   a steering wheel assembly mounted in said truck for guiding of said truck in relation to ground marking,
   means mounted on said steering wheel assembly for rotation therewith,
   a hydraulic control system operatively connected with said means mounted on said steering wheel assembly,
   said hydraulic control system including
      a hydraulic valve operated in conjunction with said means mounted on said steering wheel assembly,
      a hydraulic pump, a second valve, and a hydraulic cylinder hydraulically connected to said hydraulic valve,
      said second valve hydraulically connected in said hydraulic control system to bypass said hydraulic valve,
      said hydraulic cylinder having a piston rod attached to said support means and having the movement of said piston rod controlled by said hydraulic valve.
4. Apparatus for striping a pavement comprising
   a truck to carry the striping equipment and having steering means for steering of said truck,
   carriage means movably mounted for reciprocal transverse movement in relation to said truck,
   a hydraulic control system connected to said steering means by a ratio means for proportionate operation in conjunction with said steering means,
   and paint spraying means mounted on said carriage means in position to spray the pavement and move within the limits of extensions of longitudinal lines defining the width of said truck,
   said carriage means connected to said steering means through said hydraulic control system.

References Cited by the Examiner

UNITED STATES PATENTS

| | | | |
|---|---|---|---|
| Re. 25,126 | 2/1962 | Charlson | 121—41 |
| 954,241 | 4/1910 | Affelder et al. | 239—187 |
| 998,556 | 7/1911 | Seaver et al. | 239—187 |
| 1,928,551 | 9/1933 | Ball | 239—150 |
| 2,304,726 | 12/1942 | Beaman | 91—12 |
| 2,518,952 | 8/1950 | Sohmer | 239—165 |
| 2,959,356 | 11/1960 | Shaffer | 239—150 |
| 2,975,979 | 3/1961 | Shoffer | 239—150 |
| 3,148,833 | 9/1964 | Wilson et al. | 239—150 |
| 3,162,369 | 12/1964 | Mitchell | 239—150 |

EVERETT W. KIRBY, *Primary Examiner.*